Figure 1:
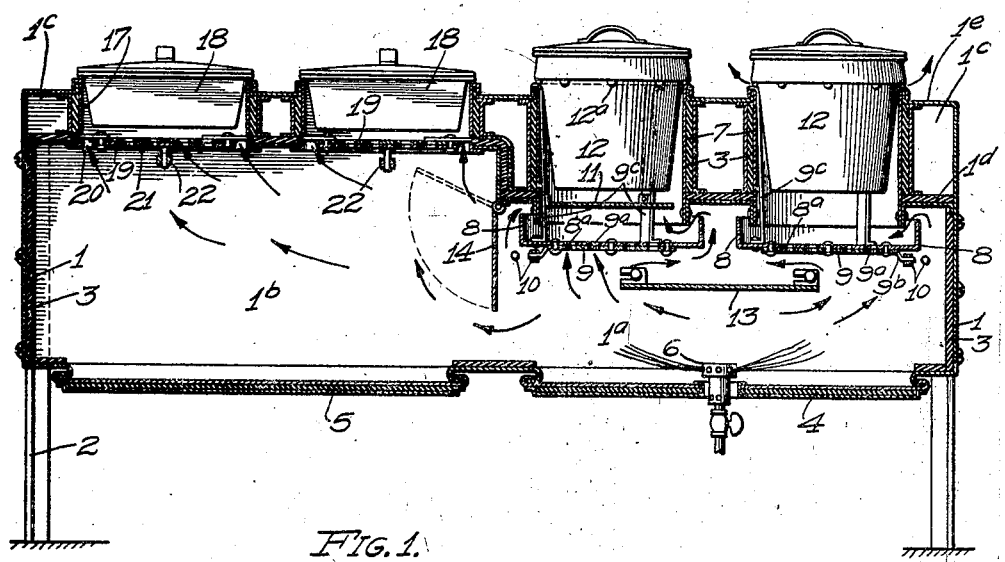

July 10, 1928.　　　　　　　　　　　　　　　　　1,676,603
W. R. DICK
COOKING AND HEATING APPLIANCE
Filed June 15, 1925　　　3 Sheets-Sheet 1

Inventor
WILLIAM R. DICK.
By A. B. Bowman
Attorney

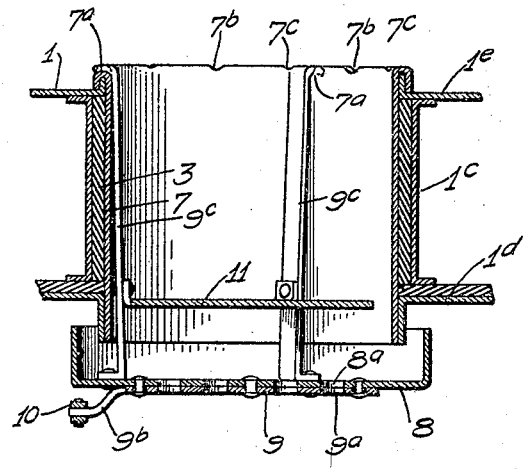
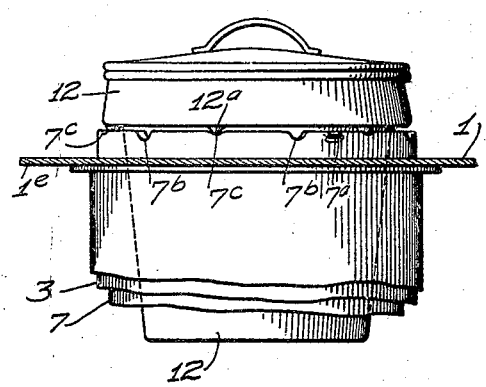
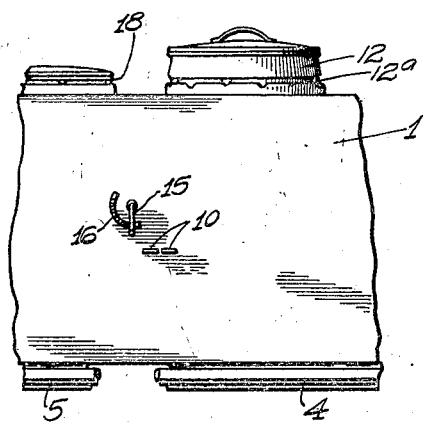

July 10, 1928.

W. R. DICK

COOKING AND HEATING APPLIANCE

Filed June 15, 1925   3 Sheets-Sheet 3

1,676,603

Inventor
WILLIAM R. DICK
By A. B. Bowman
Attorney

Patented July 10, 1928.

1,676,603

UNITED STATES PATENT OFFICE.

WILLIAM R. DICK, OF SAN DIEGO, CALIFORNIA.

COOKING AND HEATING APPLIANCE.

Application filed June 15, 1925. Serial No. 37,044.

My invention relates to a combined cooking and heating appliance, particularly adapted for restaurant and other similar uses, and the objects of my invention are: First, to provide an appliance of this class whereby foodstuffs of all kinds or other products may be cooked, roasted, baked or otherwise prepared at great variations of temperature without danger of burning, searing or otherwise injuring or destroying the foodstuffs or other products, and whereby the foodstuffs or other products may be readily heated and retained at definite temperatures over a great range of temperature; second, to provide an appliance of this class having novel heat diverting means whereby hot gases of combustion may be applied substantially directly to the cooking, roasting or baking vessels and uniformly distributed around the greater portion of the same, or whereby the hot gases of combustion may be indirectly applied to said vessels in a manner to permit only the gases of combustion of moderate temperatures to impinge against and surround the walls of the vessel for keeping the same warm, as desired; third, to provide an appliance of this class having a relatively deep double top wall in which the cooking, roasting or baking vessels may be positioned with their upper ends substantially flush with the top of the appliance, and whereby the hot gases of combustion in the firebox thereof are retained at a low level so as to be readily directed into the lower end of the compartment or receptacle container in which the various vessels are adapted to be positioned in order to apply the greatest heat, and with the least losses, to the bottom ends of the vessels; fourth, to provide a novel means in connection with an appliance of this class for permitting the hot gases of combustion to be discharged in regulated quantities at the upper portion of the vessel to be heated; fifth, to provide an appliance of this class whereby pans or vessels at one end of the appliance may be heated to a cooking or roasting temperature from a source of heat at the other end of the appliance or substantially cut off from said source of heat by a shiftable baffle means, so that the temperature in said first mentioned end is reduced to a warming temperature only, as desired; sixth, to provide an appliance of this class whereby a relatively large number of pans and vessels may be heated to a cooking or roasting temperature by means of the use of only one relatively small burner, thereby providing for great economy in operation, and also reducing to a minimum the dangers of explosion from escaping fuel gases caused by the flame of the burner being blown out when the same is turned down to as to provide for a simmering temperature for the pans or vessels or for merely retaining the same at a warming temperature; seventh, to provide as a whole a novelly constructed and arranged combined cooking and heating appliance, and eighth, to provide an appliance of this class which is simple and economical of construction, durable, easy to manipulate, easy to keep sanitary, free from the usual inconveniences of hot water or steam heating, an appliance of this class which is highly efficient and which will not readily deteriorate or get out of order.

Figure 2:
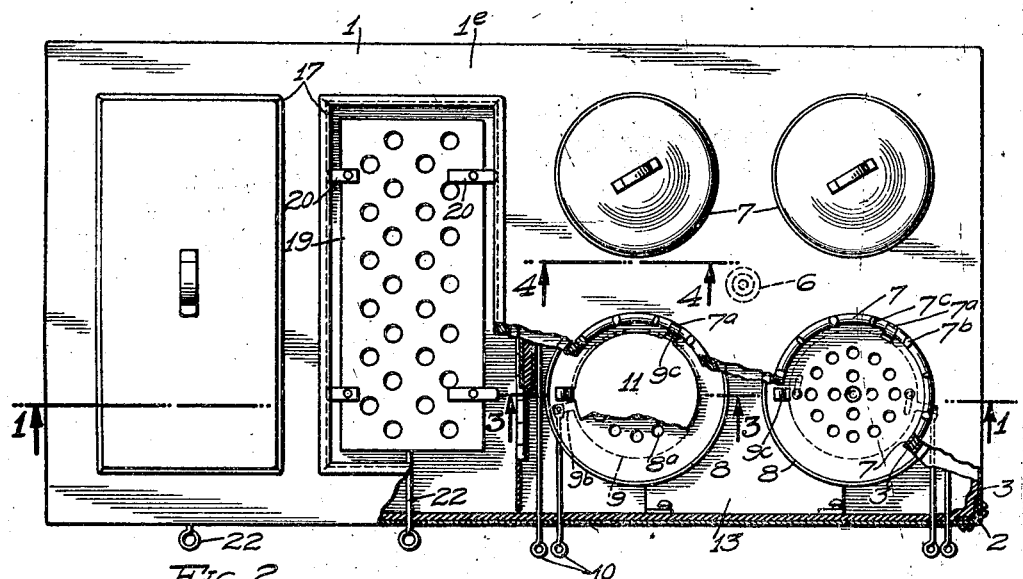
Figure 6:
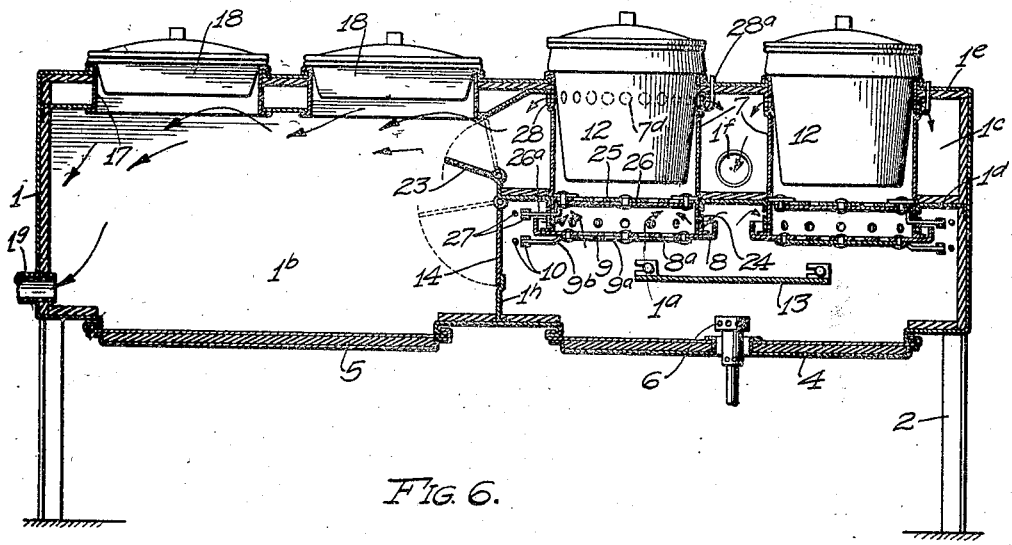
Figure 7:
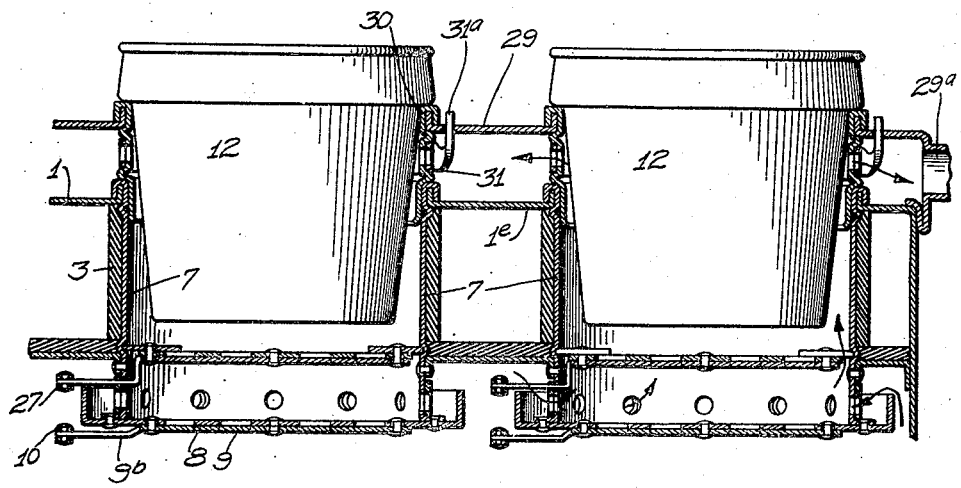

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the character of reference thereon, which form a part of this application, in which:

Figure 1 is a longitudinal sectional view through one form of construction of my appliance, showing certain parts and portions thereof in elevation to facilitate the illustration, the section being taken through 1—1 of Fig. 2; Fig. 2 is a plan view thereof, showing parts and portions thereof removed or broken away and in section to facilitate the illustration; Fig. 3 is an enlarged fragmentary sectional elevational view thereof, taken through 3—3 of Fig. 2; Fig. 4 is also an enlarged fragmentary sectional elevational view thereof, taken through 4—4 of Fig. 2, showing particularly the arrangement and construction of the cooking vessel and its supporting means for permitting the discharge of the hot gases of combustion near the upper portion of the vessels; Fig. 5 is a fragmentary front elevational view thereof; Fig. 6 is a longitudinal sectional elevational view similar to that of Fig. 1, showing my cooking and heating appliance in a slightly modified form of construction, and Fig. 7 is an enlarged sectional elevational view of a fragmentary portion of my appliance in another slightly modified form of construction.

Like characters of reference refer to similar parts and portions throughout the several views of the drawings.

Referring to Figs. 1, 2, 3, 4 and 5 of the drawings, showing the one form of construction of my combined cooking and heating appliance, 1 is the body of my appliance having a large combustion or heating chamber extending from one end thereof to the other and substantially divided into two separate compartments 1ª and 1ᵇ. The body 1 is preferably supported from the floor by legs 2. The upper portion of the body 1 is double walled and of considerable depth, providing an airtight air space between the combustion or heating chamber proper and the top side or upper wall of the body 1, as indicated by 1ᶜ. The outer wall forming the combustion or heating chamber is preferably lined with a heat insulating material 3. The lower wall of the combustion or heating chamber of the body 1 is preferably provided with two openings which are covered by readily removable heat insulating cover plates or doors 4 and 5. In the compartment 1ª is positioned a gas burner 6, preferably one only, which extends therein through the cover or door 4.

Through the double wall at the upper portion of the body 1 over the compartment 1ª of the combustion chamber extends a plurality of cylindrical cooking vessel containers 7 which extend a short distance below the lower wall 1ᵈ, forming the upper wall of the combustion chamber in the compartment 1ª, and slightly above the upper wall 1ᵉ of the body 1. Said cylindrical containers are also preferably lined at their outer walls with a heat insulating material 3, as shown. Below the lower ends of the cylindrical containers 7 are provided dish-shaped heat diverting members 8, the flanges at the peripheral portions thereof being positioned preferably outside of and extending above the lower ends of said cylindrical containers. Said heat diverting members or plates 8 are secured to the lower ends of yieldable supports or straps 9ᶜ which extend upwardly through said containers and are removably secured by means of hook portions at their upper ends in notches 7ª at the upper outer ends of said cylindrical containers.

Said heat diverting members 8 are provided with a plurality of ports 8ª which are adapted to be uncovered and aline with corresponding ports 9ª in the heat controlling plates 9, pivotally mounted axially with and on the under sides of the members 8 when said plates 9 are shifted to a certain position relatively to the members 8. The ports in the members 8 are adapted to be covered by said plates 9 when the latter are shifted to other positions. The plates 9 are provided with outwardly extending arms 9ᵇ which are pivotally connected at their outer ends with rods 10 extending through the outer or front side wall of the body 1 as shown in Figs. 2 and 5. In certain of said cylindrical containers 7 are positioned additional heat diverting plates 11 which are also secured to the supporting members or straps 9ᶜ, as shown in Figs. 1, 2 and 3, said plates 11 being spaced at their outer edges from the inner walls of the cylindrical containers, and are adapted for additionally protecting the bottoms of the cooking vessels 12 positioned therein for cooking delicate foods or other products. When the ports 8ª in the heat diverting members 8 are opened, the hot gases of combustion from the burner 6 are permitted to pass substantially directly into the lower ends of the cylindrical receptacle or vessel containers 7 but are prevented from coming in direct contact with the bottoms of those vessels 12 positioned in the containers provided with the additional heat diverting plates 11. When the ports 8ª are opened, as stated, sufficient heat is permitted to enter the lower ends of the receptacle or vessel containers for cooking any and all foodstuffs and still prevent the same from burning. When the ports 8ª are closed, the food or other product in the vessels 12 may be retained at most any heat desired by regulating the burner 6 or by controlling the perforated heat controlling plate 9.

Within the compartment 1ª of the combustion chamber is preferably positioned a heat distributing plate 13 which is positioned over the burner 6 for more uniformly distributing the heat under all of the vessel containers, as shown best in Fig. 1.

The heat diverting members 8 are preferably removably supported within the vessel containers 7, as described, to permit the same to be readily removed in case it is desired to have a direct heat against the bottom and side walls of the cooking vessel.

The outer side walls of the cooking vessels 12 are spaced from the inner side walls of the vessel containers 7 to permit the hot gases of combustion to pass freely to the upper portions of the same and be discharged into the atmosphere at the upper ends of the vessel containers 7. At the upper ends of the containers 7 extending beyond the upper wall 1ᵉ of the body 1 is provided a plurality of equally spaced notches 7ᵇ and 7ᶜ of different depths, the latter being shallower than the former. The cooking vessels 12 are provided with annular shoulders near their upper ends which support said vessels at the upper ends of the cylindrical containers 7. Said shoulders are provided with a plurality of equally spaced, downwardly extending lugs 12ª corresponding with either of the notches 7ᵇ and 7ᶜ. When the cooking vessel 12 is rotated so that the lugs 12ª are opposite the notches 7ᵇ, the shoulder of the vessel 12 rests directly on the upper end or ledge of the cylindrical container and when said lugs are rotated to positions opposite the notches 7ᶜ, the shoulder of the vessel 12 is raised from the upper end of the cylindrical container 7 permitting the hot gases of combustion to escape into the atmosphere. When the vessel 12 is rotated to any intermediate position, the opening between the upper end of the container 7 and the vessel 12 is correspondingly increased, permitting a greater proportion of the hot gases to be exhausted into the atmosphere, thereby providing greater heat for the side walls of the vessel so positioned.

Separating the compartments 1ª and 1ᵇ of the combustion or heating chamber is a damper plate 14 which is pivotally supported at its upper edge and adapted to be rotated about its pivotal axis by a lever 15 adapted to engage a quadrant member 16 at the outer or front side wall of the body 1, as shown in Fig. 5. When the damper plate 14 is in the position shown by solid lines in Fig. 1, the greater portion of the hot gases of combustion is retained in the compartment 1ª, but when the same is rotated to the position shown by dotted lines, the hot gases of combustion are permitted to pass freely into the compartment 1ᵇ for heating the vessel supported at the upper portion of the same.

Extending through the double wall at the upper portion of and over the compartment 1ᵇ are other receptacle or pan containers 17, preferably of rectangular shape, as shown in Fig. 2, which are adapted to support at their upper ends the receptacles or pans 18 which are also preferably provided with lugs extending downwardly from their supporting ledges or shoulders for spacing said ledges from the upper ends of the receptacle or pan containers 17. At the lower ends of the rectangularly shaped containers 17 are removably supported ported heat diverting plates 19, by means of supporting members 20 pivotally secured to the plates 19, as shown in Figs. 1 and 2. At the lower sides of the ported heat diverting plates 19 are shiftably supported heat controlling plates 21, which are correspondingly ported, and adapted to cover or uncover the ports in the plates 19. The plates 21 are shifted relatively to the plates 19, preferably by means of rods 22 extending through the front outer wall of the body 1. The ported heat controlling plates 21 are similarly adapted to control the flow of hot gases of combustion around the bottom portion of the pans 18.

In the modified form of construction, shown in Fig. 6, the cylindrical vessel containers 7 are provided with discharge ports 7ᵈ around their peripheries at spaced distances from their upper ends which are adapted to discharge the hot gases of combustion into the space 1ᵉ surrounding said cylindrical containers between the double walls at the upper end of the body 1. The hot gases of combustion are then permitted to be discharged into the atmosphere through a flue 1ᶠ, connected with the space 1ᵉ, or are diverted into the compartment 1ᵇ of the body through an opening adapted to be covered by a damper plate 23 pivotally mounted at its lower edge intermediate the ends of the body 1 and extending transversely across the same, as shown. When the damper plate 23 is open, as shown by solid lines in Fig. 6, the hot gases of combustion are permitted to impinge freely against the bottom and side walls of the pans 18, supported at the upper portion of the compartment 1ᵇ, and are thence discharged to the atmosphere through the flue 1ᵍ.

The damper plate 14 in this modified form of construction is adapted to engage at its lower edge a wall 1ʰ extending upwardly from the bottom wall of the body 1, thus sealing the compartments 1ª and 1ᵇ from each other when the damper plate 14 is shifted to the solid line position.

At the lower end of each of the cylindrical vessel containers 7 extending into the compartment 1ª of the combustion chamber is secured a dish-shaped heat diverting member 8, similarly constructed and ported as the members 8, previously described. To the lower side of each heat diverting member 8 is also secured a heat controlling ported plate 9 controlled, by means of a rod 10, through the front side of the body 1 of my appliance. The lower ends of the cylindrical containers 7, in this modified form of construction, are ported at their peripheries and are provided around said ported portions with ported heat controlling bands 24. Within the cylindrical containers, near their lower ends and spaced from the heat diverting members 8, are positioned other heat diverting plates 25 supported in annular grooves in said containers but spaced at their peripheries from the inner walls of said containers, as shown. These heat diverting plates 25 are also ported. At the under side of the plates 25 are rotatably mounted other ported heat controlling plates 26 which are provided with controlling arms 26ª extending outwardly through long arcuate slots at the lower ends of the cylindrical containers 7 and through narrow slots in the ported heat controlling bands 24 and are connected at their outer ends to rods 27 also extending beyond the front wall of the body 1, as described in connection with the rod 10. The long arcuate slots in the lower ends of the cylindrical containers 7 permit the ported heat controlling plates 26 and the ported heat controlling bands 24 to be rotated together relatively to the lower ends of the cylindrical containers 7.

Around the portion of the cylindrical containers 7 provided with the ports $7^d$ are also preferably positioned ported bands 28 having handle or shifting portions $28^a$ which preferably extend upwardly through the upper wall $1^e$ of the body 1, as shown, for opening and closing the ports $7^d$ from the upper side of the appliance.

It will be here noted that the ports in the heat diverting plates 25 are closed when the ports at the lower ends of the cylindrical containers 7 are uncovered, thus permitting the hot gases of combustion to enter the upper portions of the cylindrical containers, in which the cooking vessels are positioned, through the last mentioned ports and the space between the heat diverting plates 25 and the walls of the cylindrical containers. If more heat is required for the cooking vessel, the ports in the heat diverting members 8 are uncovered by shifting the rods 10. If extreme heats are required for the cooking vessels, the ports in the heat diverting members 8 and in the upper heat diverting plates 25 are uncovered permitting substantially direct heat or the hot gases of combustion to enter directly into the compartment occupied by the cooking vessels. To shut off the hot gases entirely from within the cylindrical vessel containers, the ports in the heat diverting members 8 are closed, as well as the ports at the lower ends of said cylindrical containers, thus excluding all hot gases from below; at the same time, the ports $7^d$ at the upper ends of the cylindrical vessel containers are covered by shifting the shifting members $28^a$ of the ported heat controlling bands 28.

In the other modified form of construction, shown in Fig. 7, the construction of the body 1, the vessel containers, heat controlling plates, and the like, is substantially the same as that shown in Fig. 6 except that no ports are provided in the upper portions of the walls of the cylindrical containers 7, but instead a superstructure 29 is provided having a plurality of downwardly extending cylindrical members 30 corresponding with the cylindrical containers 7 mounted in the body 1, which cylindrical members 30 extend into the upper ends of the cylindrical containers 7, for supporting the superstructure 29 and positioning the same relatively to the upper portion of the body 1. The cylindrical members 30 are similarly provided with ports as described in connection with the cylindrical containers in the other modified form of construction to permit the escape of the gases of combustion into the space between the upper wall of the superstructure 29 and the upper wall $1^e$ of the body 1. Around the ported portions of the cylindrical members 30 are positioned other ported heat controlling bands 31 similar to the bands 28 in the other modified form of construction. These bands are similarly provided with extended shifting portions $31^a$ for shifting said bands preferably from the upper side of the upper wall of the superstructure 29, thus performing substantially the same functions as those in the other modified form of construction. The superstructure 29 is also provided with a flue $29^a$ to permit the escape of the gases of combustion from the space between the superstructure and the upper wall of the body 1.

Though I have shown and described a particular construction, combination and arrangement of parts and portions and certain modifications thereof, I do not wish to be limited to this particular construction, combination and arrangement nor to the modifications, but desire to include in the scope of my invention the construction, combination and arrangement substantially as set forth in the appended claims.

Having thus described my invention, what I claim as new and desire to secure by Letters Patent is:

1. In an appliance of the class described, a body provided with a combustion chamber, a heating means positioned in said combustion chamber, a receptacle container supported at the upper portion of said combustion chamber, communicating at its lower end therewith and adapted to receive a receptacle and support the same at its upper end, said container being adapted to surround the outer side wall of said receptacle in spaced relation relatively thereto, a heat diverting plate positioned at the lower end of said container, there being provided passages at the lower end of said container, permitting gases of combustion from said combustion chamber to pass into said container and upwardly therein around the receptacle adapted to be positioned therein.

2. In an appliance of the class described, a body provided with a combustion chamber, a heating means positioned in said combustion chamber, a receptacle container supported at the upper portion of said combustion chamber, communicating at its lower end therewith and adapted to receive a receptacle and support the same at its upper end, a heat diverting plate positioned at the lower end of said container, there being provided passages at the lower end of said container, permitting gases of combustion from said combustion chamber to pass into said container and upwardly therein around the receptacle adapted to be positioned therein, and another heat diverting plate positioned within said container and spaced upwardly from its lower end and from said first mentioned heat diverting plate.

3. In an appliance of the class described, a body provided with a combustion chamber, a heating means positioned in said combustion chamber, a receptacle container supported at the upper portion of said combustion chamber, communicating at its lower end therewith and adapted to receive a receptacle and support the same at its upper end, a heat diverting plate positioned at the lower end of said container, there being provided passages at the lower end of said container, permitting gases of combustion from said combustion chamber to pass into said container and upwardly therein around the receptacle adapted to be positioned therein, said heat diverting plate being provided with a plurality of perforations, and a perforate plate shiftably supported on said heat diverting plate, the perforations thereof being adapted to aline with the perforations of said heat diverting plate.

4. In an appliance of the class described, a body provided with a combustion chamber, a heating means positioned in said combustion chamber, a receptacle container supported at the upper portion of said combustion chamber, communicating at its lower end therewith and adapted to receive a receptacle and support the same at its upper end, a heat diverting plate positioned at the lower end of said container, there being provided passages at the lower end of said container, permitting gases of combustion from said combustion chamber to pass into said container and upwardly therein around the receptacle adapted to be positioned therein, and another heat diverting plate positioned within said container and spaced upwardly from its lower end and from said first mentioned heat diverting plate, the outer edges of said other heat diverting plate being spaced from the inner wall of said receptacle container to prevent the hot gases of combustion from coming in direct contact with the bottom of the receptacle adapted to be positioned in said container and to permit free passage of the hot gases around the side walls of said receptacle.

5. In an appliance of the class described, a body provided with a combustion chamber, a heating means positioned at the lower portion of said combustion chamber, a heat distributing plate positioned over said heating means adapted to distribute the heat therefrom uniformly in said combustion chamber, a plurality of receptacle containers supported at the upper portion of said combustion chamber, communicating therewith at their lower ends and adapted to receive and support at their upper ends cooking receptacles, and heat diverting plates supported at the lower ends of said containers.

6. In an appliance of the class described, a body provided with a combustion chamber, a damper plate pivotally mounted intermediate the ends of said combustion chamber and extending transversely across the same dividing said combustion chamber into two compartments, a heating means positioned at the lower portion of one of said compartments, a heat distributing plate positioned in said one compartment over said heating means, and a plurality of receptacle containers supported at the upper portions of the separate compartments of said combustion chamber communicating at their lower ends therewith and adapted to receive therein and support at their upper ends cooking receptacles.

7. In an appliance of the class described, a body provided with a combustion chamber, a damper plate pivotally mounted intermediate the ends of said combustion chamber and extending transversely across the same dividing said combustion chamber into two compartments, a heating means positioned at the lower portion of one of said compartments, a heat distributing plate positioned in said one compartment over said heating means, a plurality of receptacle containers supported at the upper portions of the separate compartments of said combustion chamber communicating at their lower ends therewith and adapted to receive therein and support at their upper ends cooking receptacles, ported heat diverting plates supported at the lower ends of said containers, and ported heat controlling plates shiftably supported on said heat diverting plate for opening and closing the ports therein.

8. In an appliance of the class described, a body provided with a combustion chamber, a damper plate pivotally mounted intermediate the ends of said combustion chamber and extending transversely across the same dividing said combustion chamber into two compartments, a heating means positioned at the lower portion of one of said compartments, a heat distributing plate positioned in said one compartment over said heating means, cylindrical cooking vessel containers supported at the upper portion of said one compartment of said combustion chamber, extending therein and communicating at their lower ends therewith, cooking vessels positioned within and supported at the upper ends of said containers, there being provided passages at the upper portion of said containers for permitting the escape of the hot gases of combustion from said combustion chamber and for heating the upper portion of said vessel, other receptacle containers supported at the upper portion of said combustion chamber over said other compartment therein and communicating with said other compartment, shallow cooking receptacles positioned within and supported at the upper ends of said receptacle containers, there being also provided passages at the upper portions of said receptacle containers for permitting the escape of the gases of combustion from said other compartment of said combustion chamber, and heat controlling members supported at the lower ends of said containers.

9. In an appliance of the class described, a body provided with a combustion chamber having a substantially flat upper wall, and a relatively deep receptacle container extending through said wall with its lower end terminating substantially on a level therewith, said container extending a considerable distance above said wall and adapted to receive and support therein at its upper end a receptacle.

10. In an appliance of the class described, a cylindrical receptacle container and a receptacle adapted to extend into said container and provided with a shoulder at its upper portion adapted to rest on the upper end of said container, the upper end of said container and the shoulder of said receptacle being provided with cooperating notch and lug means for variously positioning said receptacle relatively to said container.

11. In an appliance of the class described, a cylindrical receptacle container provided with a plurality of inwardly extending notches at its upper end, and a receptacle adapted to extend into said container and provided with a shoulder at its upper portion adapted to rest on the upper end of said container, said shoulder being provided with downwardly extending lugs adapted to extend into the notches at the upper end of said container and variously position said receptacle relatively thereto.

12. In an appliance of the class described, a cylindrical container adapted to receive heated gases at its lower end and provided at its upper end with a plurality of variously inwardly extending receptacle positioning notches, and a receptacle positioned within said container and provided at its upper portion with a shoulder, said shoulder being provided with a plurality of downwardly extending lugs of equal length adapted to rest at the upper end of said container and in the various notches thereof for variously positioning said receptacle relatively to said container, providing gas discharge openings of various sizes between the upper end of said container and the shoulder of said receptacle.

13. In an appliance of the class described, a combustion chamber, a heating means positioned in said combustion chamber, a receptacle container supported at the upper portion of said combustion chamber communicating at its lower end therewith and adapted to receive therein and support at its upper end a receptacle, a plurality of readily removable supports provided with hook portions at their upper ends adapted to suspend from the upper end of said receptacle container, and a heat diverting plate secured to the lower ends of said removable supports below the lower end of said receptacle container.

14. In an appliance of the class described, a combustion chamber, a heating means positioned in said combustion chamber, a receptacle container supported at the upper portion of said combustion chamber communicating at its lower end therewith and adapted to receive therein and support at its upper end a receptacle, a plurality of readily removable supports provided with hook portions at their upper ends adapted to suspend from the upper end of said receptacle container, a heat diverting plate secured to the lower ends of said removable supports below the lower end of said receptacle container, and another heat diverting plate secured intermediate the ends of said removable supports and positioned within and spaced from the walls of said receptacle container.

15. In an appliance of the class described, a combustion chamber, a heating means positioned in said combustion chamber, a receptacle container supported at the upper portion of said combustion chamber, extending therein, communicating at its lower end therewith and adapted to receive a receptacle and support the same at its upper end, a dished heat diverting member supported at the lower end of said receptacle container with its flanged portion positioned outwardly from and extending upwardly to substantially the lower end of said receptacle container.

16. In an appliance of the class described, a combustion chamber, a heating means positioned in said combustion chamber, a receptacle container supported at the upper portion of said combustion chamber, extending therein, communicating at its lower end therewith and adapted to receive a receptacle and support the same at its upper end, a dished heat diverting member supported at the lower end of said receptacle container with its flanged portion positioned outwardly from and extending upwardly to substantially the lower end of said receptacle container, said dished heat diverting member being provided with a plurality of ports, and a ported heat control plate rotatably mounted on said dished heat diverting member adapted to open and close the ports in the latter.

17. In an appliance of the class described, a body provided with a combustion chamber having a substantially flat upper wall, a relatively deep receptacle container extending through said wall with its lower end terminating slightly below the level of said wall, said container extending a considerable distance above said wall and adapted to receive and support therein at its upper end a receptacle, and a heat diverting member provided with an upwardly extending flange extending around and slightly above the lower end of said receptacle container, substantially forming a trap for the passage of hot gases from the lower side of said heat diverting member into said receptacle container.

In testimony whereof, I have hereunto set my hand at San Diego, California, this 8th day of June, 1925.

WILLIAM R. DICK.